United States Patent [19]

Tsunashima

[11] 3,963,529

[45] June 15, 1976

[54] SOLDERING FLUX

[75] Inventor: Eiichi Tsunashima, Hirakata, Japan

[73] Assignee: Matsushita Electric Industrial Co., Ltd., Japan

[22] Filed: Feb. 3, 1975

[21] Appl. No.: 546,781

Related U.S. Application Data

[63] Continuation of Ser. No. 195,865, Nov. 4, 1971, abandoned.

[30] Foreign Application Priority Data

Dec. 7, 1970 Japan.............................. 45-109215

[52] U.S. Cl.................................. 148/25; 228/207; 228/223
[51] Int. Cl.².......................................... B23K 35/34
[58] Field of Search ............ 148/25, 29, 23; 29/495; 260/97

[56] References Cited

UNITED STATES PATENTS

| | | | |
|---|---|---|---|
| 2,553,226 | 5/1951 | Williams .............................. | 148/25 |
| 2,904,459 | 9/1959 | Kuboto ................................ | 148/23 |
| 3,478,414 | 11/1969 | Potter et al. ...................... | 260/97 X |

FOREIGN PATENTS OR APPLICATIONS

| | | | |
|---|---|---|---|
| 118,973 | 10/1944 | Australia................................ | 260/97 |

OTHER PUBLICATIONS

Harris, George C., "Rosin and Rosin Derivatives", a Reprint from *Encyclopedia of Chemical Technology*, Dec., 1953, pp. 779, 807, 808, 809.

Kirk–Othmer, *Encyclopedia of Chemical Technology*, Second Edition, vol. 17, copyright 1968, p. 505.

Pringle, E. W., "Non–Combustible Flux for Printed Circuit Boards", IBM Technical Disclosure Bulletin, vol. 3, No. 1, June 1960.

*Thorpe's Dictionary of Applied Chemistry*, 4th Edition, vol. X, 1950, pp. 548, 549.

*Primary Examiner*—Ronald J. Shore
*Attorney, Agent, or Firm*—Wenderoth, Lind & Ponack

[57] ABSTRACT

The invention relates to a novel non-corrosive rosin oil flux and a novel method of soldering which comprises the use of said flux.

2 Claims, No Drawings

SOLDERING FLUX

This is a continuation of application Ser. No. 195,865, filed Nov. 4, 1971, now abandoned.

This invention relates to a soldering flux and soldering method.

In soldering electronic components, circuits, equipments, etc., various kinds of fluxes are used together with soldering material so as to improve the efficiency of the soldering operation, to secure the soldered connections and to improve the long-term reliability of the connections. Conventionally, there are mainly used three kinds of flux: water soluble flux which is made from inorganic acids, organic acids, etc., natural rosin and activated rosin having a halogenated compound incorporated with natural rosin.

Water-soluble flux is very useful in removing oxides from the metal surface to be soldered. However, there are disadvantages that the water-soluble flux is apt to destroy metallic material and leaves residues which corrode the soldered parts after soldering. The corrosion impairs the reliability of the soldered parts with respect to electrical and mechanical properties.

Natural rosin which is available under a name of WW rosin (water white rosin) presents no problems with respect to corrosiveness, but is inferior as a soldering adjuvant (such effect is described as a fluxing action hereinafter).

Activated rosin has a stability similar to natural rosin and causes little corrosion at room temperature. It has also a strong fluxing action at a soldering temperature due to activators such as the halogenated compounds. However, the activated rosin has disadvantages in that a corrosive gas is produced at a soldering temperature and harms the surface of metal such as brass, etc. Moreover, the residues of the activated rosin combine with moisture and produce an acid which causes corrosion similar to that produced by the water-soluble flux.

Therefore, an object of the present invention is to provide a soldering flux which is superior in fluxing action and is free from corrosive reaction as well as harmful residual and corrosive gas.

Another object of the invention is to provide a soldering method which does not require a cleaning step of flux residues after soldering.

A soldering flux according to the present invention comprises rosin oil having an average molecular weight of 120 to 80. Said rosin oil is obtained as the distillate by cracking rosin at a temperature of 180° to 250°C.

Use of said soldering flux improves the degree of spreading of solder, reduces corrosiveness and improves electric insulation as explained hereinafter. Particularly, said soldering flux greatly lowers the change in the electric resistance of thick film resistor before and after soldering.

The starting material is rosin acid and its derivatives. These materials are commercially available and comprise abietic acids and their optical isomers having an average molecular weight of about 1200. Such a rosin is cracked at a temperature of 180° to 250°C. The yield of cracked material is usually 150 grams per 1 kg of the rosin when employing WW grade manufactured by Hercules Inc., U.S.A. (FF grade is also available). Then, the cracked material is condensed in a glass cooling tube so as to obtain rosin oil having an average molecular weight of 120 to 80. Said rosin oil starts to evaporate at a temperature of 190° to 260°C and leaves no residue on the surface of materials to be soldered when soldering is carried out at 190° to 350°C. It is rather difficult to define exactly said rosin oil. The main components of said rosin oil are monocyclic compounds of turpentine. The average molecular weight referred to herein is defined as the molecular weight obtained by a molal elevation of the boiling point method well known in organic chemistry. Said rosin oil flux has a larger dissociation constant and a better fluxing action than fluxes based on conventional water white rosin.

A dissolution of said rosin oil in a suitable and available solvent does not impair the fluxing action. Preferred solvents include alcohols such as methanol, ethanol, n-propyl alcohol, isopropanol, n-butanol, cyclohexanol, benzyl alcohol, α-terpineol, ketones such as acetone, cyclohexanone, methyl ethyl ketone, esters such as methyl acetate, ethyl acetate, diethylene glycol monoethyl ether acetate, diethylene glycol monobutyl ether. A good result can be obtained by using a composition consisting essentially of not less than 70 weight % of said rosin oil and not more than 30 weight % of said solvent. The cracking temperature has an important effect on the performance as a fluxing agent. A cracking temperature higher than 250°C results in a large amount of residue after soldering at 190° to 350°C. A cracking temperature below 180°C results in a rosin oil having an evaporation rate too low to be used as a soldering flux without residues.

A soldering method according to the present invention comprises the following steps; applying a soldering flux consisting of aforesaid rosin oil or rosin oil dissolved in aforesaid solvent to materials to be soldered, so that the surfaces of said materials are cleaned; bringing a solder into contact with the cleaned surfaces; and melting said solder at a temperature of 190° to 350°C, preferably 190° to 260°C. A soldering temperature higher than 350°C causes said soldering flux to carbonize and to stay at the cleaned surfaces. A soldering temperature lower than 190°C is not sufficient for complete evaporation of said soldering flux during an allowable soldering time. A preferable soldering temperature is 190° to 260°C.

The soldering flux produced by the method of the invention has superior features as follows. That is, it has a stronger fluxing action than that of the rosin and it has no corrosive action at all. During soldering, the soldering flux neither destroys the tissue of metal plate, metal powder, etc., nor changes strength, conductivity and resistivity of soldering metal and soldered materials. The conventional soldering flux usually includes as an activator for fluxing acton, a halogenated compound, which also has a corrosive action. This soldering flux according to the invention has no halogenated compound as activator, and does not harm the functions of semiconductor, hybrid micro circuit, ceramics, resistor, capacitor, etc., when used as a soldering flux for soldering of leads to silver electrodes of these components.

EXAMPLE

The WW rosin was cracked at 180°C and the cracked material was condensed by using a glass water-cooling tube. The resultant rosin oil has an average molecular weight of 120. Three kinds of soldering fluxes were prepared by using the resultant rosin oil:

A  100 wt.% of rosin oil
B  70 wt.% of rosin oil and 30 wt.% of isopropyl-alcohol
C  80 wt.% of rosin oil and 20 wt.% of α-terpineol These soldering fluxes were tested in connection with spread of solder, corrosiveness and electric performance of hybrid micro circuit.

The evaporation rate of said rosin oil having an average molecular weight of 120 is shown in Table 1. The rosin oil in an amount of 1 cc is dropped from a tube with a diameter of 1 mm on a copper plate heated at various temperatures. The drop spreads on the copper plate and evaporates. The evaporation time of Table 1 is measured by the time between completion of dropping and disappearance of rosin oil from the copper plate.

Table 1

| Evaporation Rate of Rosin Oil | |
|---|---|
| temperatures | evaporation time |
| 190°C | 15–20 sec. |
| 230°C | 5–3 sec. |
| 260°C | 2–1 sec. |

The effect of cracking temperature on the average molecular weight of resultant rosin oil is shown in Table 2. The WW rosin manufactured by Hercules Inc., U.S.A. is cracked by a per se well-known organic chemistry technique in a reaction vessel at various temperatures. The cracked materials are condensed by using a water-cooled condenser (glass tube).

Table 2

| Relation Between Cracking Temperaure and Average Molecular Weight of Rosin Oil | | |
|---|---|---|
| cracking temp. | condensing temp. | average molecular weight |
| 180°C | 30°C | 120 |
| 230°C | 30°C | 90 |
| 250°C | 30°C | 80 |

Test

1. Spread of solder

After the samples A, B and C were applied to a copper plate, a solder ball of 5 grams comprising 50% of tin and 50% of lead was placed on the copper plate. The plate with the solder ball was heated at 260°C for five seconds in order to melt the solder ball. The spread areas of the solder were measured with reference to that of the conventional soldering flux. The following Table 3 shows the ratio of the spread area.

Table 3

| Spread Area of Solder | | | isopropanol solution of WW rosin (25 wt.%) |
|---|---|---|---|
| sample A | sample B | sample C (containing α-terpineol) | |
| 2.5 | 1.5 | 1.8 | 1.0 |

2. Corrosiveness

The copper plates having the solder spread thereon according to test (1) were kept in moisture of 90 to 95% RH (relative humidity) at a temperature of 40°C for 1,000 hours without being cleaned. There was no corrosiveness observed with the samples A, B and C.

3. Electric insulation

The samples A, B and C were applied to a whole surface of an epoxide-glass based printed-circuit board having insulation resistance higher than $10^6$ MΩ and heated at a temperature of 260°C for five seconds. After being heated, the board was kept in the high humidity of 95% RH at 40°C for 1,000 hours. After the high humidity test, the board maintained an insulation resistance higher than $10^6$ MΩ.

4. Change of resistance value of thick film resistor

The samples A, B and C were applied to a surface of a thick film hybrid-integrated circuit having metal-glazed resistors of the Ag-Pd system and with Ag-Pd electrodes. Chipped parts were soldered to the silver electrodes by using a solder of Sn-Pb system at 260°C. The soldered circuit was kept at a high humidity of 95% RH at 40°C for 1,000 hours. Table 4 indicates resistance change of the resistor at various steps in comparison with the conventional water-soluble flux. The resistor was 4×8 mm and had a thickness of 30 microns. The electrodes were spaced 1 mm from each other.

Table 4

| | Change of Resistance Value | |
|---|---|---|
| | water-soluble flux | flux according to the invention |
| Application of soldering flux | 220% | less than 0.1% |
| Soldering | −25% | less than 0.1% |
| Humidity test for 1,000 hours | ±5%* | less than 0.2% |

*The circuit was cleaned before humidity test.

I claim:

1. A soldering flux consisting of rosin oil having an average molecular weight of 120 to 80, which is obtained by cracking rosin at a temperature of 180°C to 250°C and then condensing the distillate.

2. A soldering flux consisting of not less than 70 weight percent of rosin oil having an average molecular weight of 120 to 80, which is obtained by cracking rosin at a temperature of 180°C to 250°C, and then condensing the distillate, and the remainder being a solvent selected from the group consisting of alcohols, ketones and esters.

* * * * *